US008010168B2

(12) United States Patent
Benveniste (10) Patent No.: US 8,010,168 B2
(45) Date of Patent: Aug. 30, 2011

(54) EFFICIENT POWER MANAGEMENT IN WIRELESS LOCAL AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/470,625

(22) Filed: May 22, 2009

(65) Prior Publication Data
US 2009/0252135 A1 Oct. 8, 2009

Related U.S. Application Data

(63) Continuation of application No. 11/034,024, filed on Jan. 12, 2005, now Pat. No. 7,603,146.

(60) Provisional application No. 60/535,537, filed on Jan. 12, 2004, provisional application No. 60/563,803, filed on Apr. 21, 2004.

(51) Int. Cl.
H04B 1/38 (2006.01)
H04B 1/04 (2006.01)

(52) U.S. Cl. ..................... 455/574; 455/127.5

(58) Field of Classification Search .......... 455/574, 455/343.1, 343.2
See application file for complete search history.

(56) References Cited

U.S. PATENT DOCUMENTS
2005/0018624 A1 * 1/2005 Meier et al. .......... 370/318
* cited by examiner

*Primary Examiner* — Lester Kincaid
*Assistant Examiner* — Joel Ajayi
(74) *Attorney, Agent, or Firm* — Chapin IP Law, LLC; David W. Rouille, Esq.

(57) ABSTRACT

A method of providing power management in a Wireless Local Area Network (WLAN) is presented. The method includes receiving a Traffic Indication Map (TIM) at a station, indicating the presence of buffered frames, associated with any AC, for the station at an Access Point (AP). The method further includes sending, by the station, one of an uplink data frame if one is buffered, and a null frame to retrieve the buffered frames from said AP. The station remains awake to receive frames from the AP until a downlink frame is received containing an indication that it is the last frame to be transmitted in the service period. The method may further include determining at the end of service period whether there are more frames remaining buffered for the station at the AP.

13 Claims, 8 Drawing Sheets

EFFICIENT POWER MANAGEMENT IN WIRELESS LOCAL AREA NETWORKS

CROSS REFERENCE TO RELATED APPLICATIONS

The present application is a continuation of U.S. patent application Ser. No. 11/034,024, filed on Jan. 12, 2005, now U.S. Pat. No. 7,603,146 which claims the benefit of U.S. Provisional Patent Application No. 60/535,537, filed on Jan. 12, 2004, and to U.S. Provisional Patent Application No. 60/563,803, filed on Apr. 21, 2004, both of which are incorporated herein by reference.

BACKGROUND

A wireless local area network (WLAN) typically includes an Access Point (AP) and one or more stations. Each station may be a device such as a notebook computer, personal digital assistant (PDA), wireless VoIP telephone or the like that transmits radio signals to and receives radio signals from other stations in the local area network via the AP.

APs and stations transmit data in units referred to as frames over a shared-communications channel. Frames transmitted from a station to an AP are referred to as uplink frames, and frames transmitted from an AP to a station are referred to as downlink frames. In a situation where two or more stations (or an AP and a station) transmit frames simultaneously, then one or more of the frames can become corrupted, referred to as a collision. As a result, Wireless Local Area Networks (WLANs) typically employ one or more protocols to ensure that a station or AP can gain exclusive access to the shared-communications channel for a predetermined interval of time in order to transmit its frames without collisions occurring. Certain wireless network protocols (e.g., Institute of Electrical and Electronics Engineers [IEEE] 802.11, etc.) provide for the AP to periodically broadcast a special frame called a beacon that can be heard by the stations in the BSA (basic service area), the area covered by the AP. The beacon contains a variety of information that enables the stations to establish and maintain communications in an orderly fashion, such as a timestamp, which enables stations to synchronize their local clocks, and signaling information (e.g., channel number, frequency hopping pattern, dwell time, etc.).

A station can prolong its battery life by powering off its radio when not transmitting or receiving. When a station powers off its radio, the station is said to enter the "doze" state. A station wakes up from the doze state by powering on its radio to enter the "awake" state. While a station is in the doze state, it cannot transmit or receive signals, and is said to be asleep. A station that saves battery life by alternating between alert states and doze states is said to be in power save (PS) mode, and a station that employs PS mode is said to be a power saving station.

While a station is asleep, the AP buffers any downlink frames for the station for eventual delivery when station is in the awake state.

One method for receiving buffered frames is described in the IEEE 802.11-1999 standard, and is referred to herein as the "legacy" power save method. In this method, an AP periodically includes a Traffic Indication Map (TIM) in the beacon to identify which stations in power-save mode have downlink frames waiting in the AP's buffer for transmission.

In accordance with legacy power save method, stations in the doze state wake up to receive beacons and check the TIM. If the TIM indicates that there are frames buffered for the station, the station will send a PS Poll to request delivery of a buffered frame. When the TIM indicates that there are no buffered downlink frames for a station, the station goes back into the doze state. In addition, a station in the doze state buffers uplink frames generated by the application layer, and transmits one or more of the buffered uplink frames upon wake-up.

Another strategy for delivering buffered packets in the AP to the appropriate station is known as Automatic Power Save Delivery (APSD), wherein the delivery of downlink buffered frames occurs without the need for PS Polls to indicate that the PS station is awake and ready to receive transmitted frames. There are two types of APSD: (i) scheduled APSD and (ii) unscheduled APSD. The two APSD variants differ with respect to initiation of the 'service period', which is the time period during which the PS station is presumed awake and able to receive a frame transmitted by the AP. With scheduled APSD, the service period starts automatically—that is, without special signaling frames to notify the AP that a station is awake and ready to receive frames. With unscheduled APSD, the transmission of an uplink frame is sufficient to signal the start of the service period, i.e., that the station is awake and ready to receive transmitted frames. The unscheduled service period begins when the AP receives from the station a QoS Data/Null frame. The station may elect to limit the access category (AC) of the frame that may initiate a service period. The AC(s) of the frames that may initiate a service period are designated by the station to through signaling such as an APSD TSPEC.

Another feature of APSD relates to the termination of the service period, the time interval a PS station must remain awake. Unlike legacy power save, where a PS station may go to sleep after receiving a single frame from the AP, APSD requires a PS station to stay awake to receive several buffered frames, and go to back to sleep only when it is notified by the AP. The AP sets the EOSP (end of service period) bit to 1 in the last frame it transmits in order to signal to the station that it will not transmit any more frames downlink until the next service period. This signals the station that it can go back to sleep.

SUMMARY

Conventional mechanisms such as the legacy power save method and APSD methods explained above suffer from a variety of deficiencies. One such deficiency in conventional WLAN environments using the legacy power save is that it is possible for multiple stations in a network to repeatedly wake up at the same time (i.e., at the same beacons), resulting in traffic delays and a concomitant increase in station power consumption. The traffic delays may result from receiving a plurality of PS polls. To use PS polls, a station listens to TIM on a beacon to determine if the AP has buffered frames for the station. When there are buffered frames for the station at the AP, the station sends a PS Poll to the AP signaling to the AP that the station is awake and waiting to receive a buffered frame. The AP sends a buffered frame to the station. If the frame has the "More Data" bit set to 1, indicating that there are more buffered frames for the station, the station will send another PS Poll to get another buffered frame. This is repeated until the AP has no more frames for the station.

Another deficiency in conventional WLAN environments is that the legacy power save mechanism may be ill-suited for traffic with delay/jitter quality-of-service (QoS) requirements (i.e., voice calls, videophone calls, and the like) because wake-up periods based on multiples of beacon intervals may be too large for the inter-frame arrival times required for adequate call quality.

Another deficiency with conventional power save methods is that the station needs to wake up to read the beacon TIM (even if there is a periodic downlink traffic stream). Further, systems employing the unscheduled APSD method as proposed to date does not efficiently retrieve non-periodic bursty traffic, as the definition of the TIM is limited to a subset of buffered frames only, those whose delivery relies on the legacy power save mechanism. Frames to be retrieved through unscheduled APSD would not be included in the TIM.

Embodiments of the invention significantly overcome such deficiencies and provide mechanisms and techniques that provide efficient power management in WLANs.

In a particular embodiment of a method for providing power management in a WLAN including an AP and at least one station, the method includes receiving a Traffic Indication Map (TIM) at a station, wherein the TIM definition is expanded to indicate the presence of buffered frames for the station at the AP, regardless of the method of their retrieval from the AP. Thus, the TIM in the proposed embodiment includes traffic that is retrieved both by the legacy power save method and by the unscheduled APSD method. The method further includes sending, by the station, an uplink null frame to retrieve the buffered frames from the AP by way of an unscheduled APSD delivery mechanism.

Another embodiment of power management in a WLAN is accomplished by determining if scheduled APSD is used for a periodic downlink traffic stream from the AP to the station. To receive any non-periodic traffic, the station need not awaken to receive a beacon Traffic Indication Map (TIM). The station finds out about other buffered frames from the More Data bit present in the control field of the downlink frame delivered during the service period. This approach is appropriate if either the service interval of the periodic downlink traffic stream is shorter than the TIM repeat interval, or the resulting delivery delay can be tolerated. This results in a power saving benefit for the station since the time the station is required to be awake is reduced.

Another embodiment of power management in a WLAN is accomplished by determining if there is a periodic downlink traffic stream from the AP to the station, retrieved with unscheduled APSD. The AP is required to send one buffered frame downlink per service period. The AP may send more buffered frames in a service period, but frames may remain buffered at the AP at the end of the service period. Again, to receive any non-periodic traffic that is buffered at the AP, the station need not be awakened to receive a TIM. The station can find out about other buffered frames from the More Data bit present in the control field of the downlink frame delivered during the service period. As before, this results in a power saving benefit for the station since the time the station is required to be awake is reduced.

Yet another embodiment of providing power management in Wireless Local Area Networks (WLANs) includes determining that downlink traffic between an AP and a station in power saving mode comprises a combination of periodic traffic and non-periodic data bursts. Scheduled Automatic Power Saving Delivery is used for delivery of the high priority traffic, the scheduled APSD mechanism including the station entering an awake state and receiving a Traffic Indication Map (TIM) indicating whether there are buffered frames for the station at the AP. The method further includes determining if scheduled APSD is used for a periodic downlink stream from the AP to the station, and when scheduled APSD is used for a periodic downlink stream, then not waking the station to receive a TIM. The station then determines if more frames are at the AP, and retrieves any remaining buffered frames for the station from the AP by sending a QoS Data/Null frame.

Still other embodiments provide a method of deriving an APSD schedule in a WLAN. The method includes adopting a basic service interval and determining whether a Traffic Specification (TSPEC) contains a request for Scheduled APSD with service interval that is a multiple of the basic service interval. When the submitted service interval is a multiple of the basic service interval then the TSPEC is accepted. When the requested service interval is not a multiple of the basic service interval then the TSPEC is denied; the station may use another power save delivery mechanism, such as Unscheduled APSD, in that case. In effect, channel time is slotted into Automatic Power Saving Delivery (APSD) channels repeating at fixed time intervals equal to the basic service interval.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
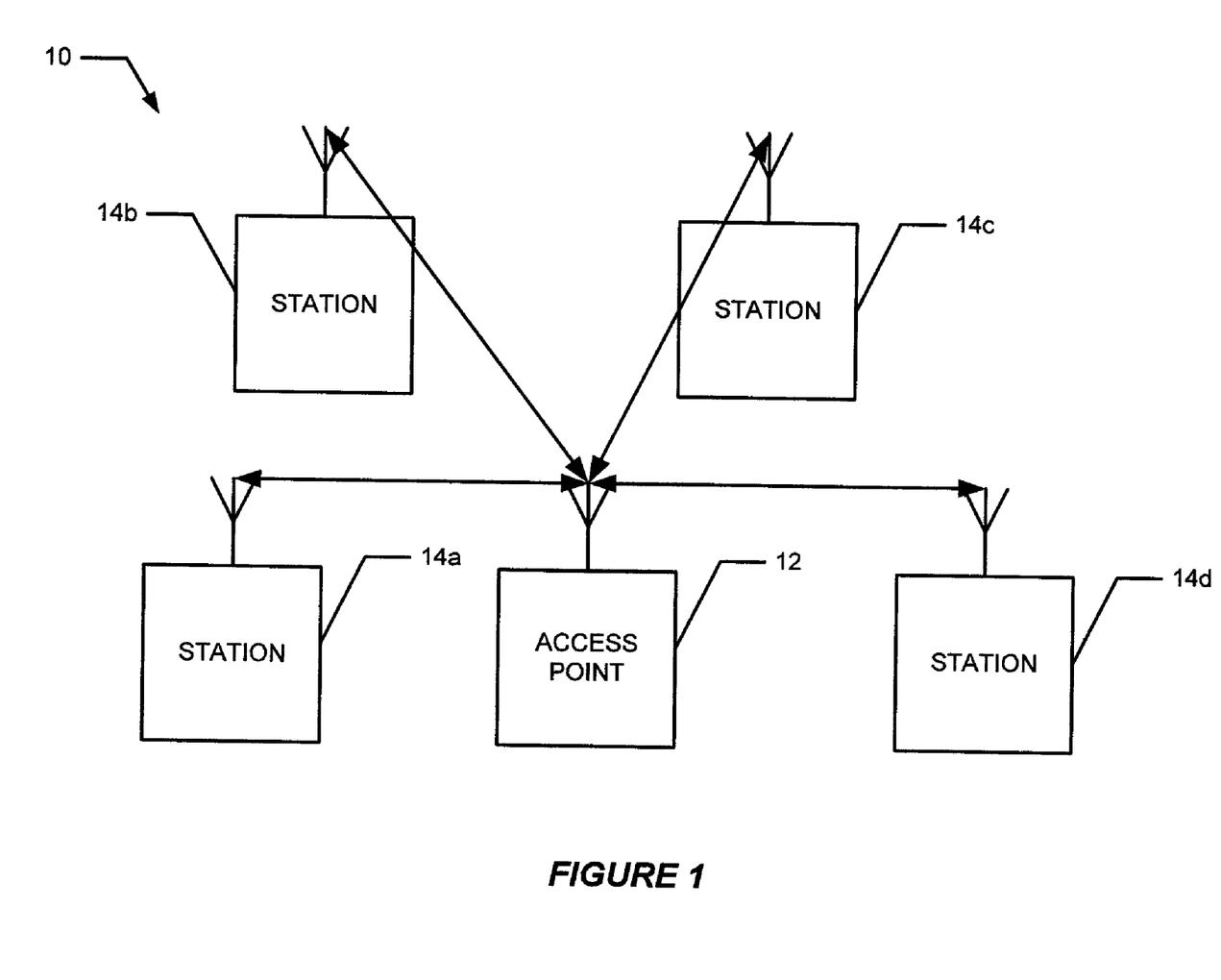
FIG. 1 comprises a block diagram of a particular embodiment of a wireless local area network environment in accordance with aspects of the present invention.

Referring to FIG. 1, a block diagram of a WLAN environment 10 in accordance with the present invention is shown. The environment 10 includes an AP 12 and a plurality of stations 14a-14d. While four stations are shown, it should be appreciated that any number of stations could be used. A station 14a-14d transmits frames over a wireless communications channel to the AP 12. A station 14a-14d is also capable of receiving frames over the wireless communication channel from the AP 12. A station is further capable of entering a power saving (PS) mode and of transmitting and receiving frames while in the power saving mode.

AP 12 receives frames from one or more stations 14a-14d via a wireless communications channel. AP 12 can also transmit frames to one or more stations 14a-14d via a wireless communications channel. AP 12 may further buffer downlink frames for a station which is in a doze state and may deliver the buffered downlink frames to the appropriate station when the station awakens from the doze state.

A station can prolong its battery life by powering off its radio when not transmitting or receiving. A station may be in one of two power management modes, an Active mode or a PS mode. As described above, frames destined for a station in PS mode may be buffered at the AP.

A station in PS mode may elect one of two methods for the delivery of its frames buffered at the AP while in the PS mode. One method is by using PS Polls. In PS polls, a station listens to a TIM to determine if the AP has buffered frames for the station. The station sends a PS Poll to the AP telling the AP that the station is awake. The AP sends a buffered frame to the station. If the frame has the "More Data" bit set, indicating that there are more buffered frames for the station, the station will send another PS Poll to get another buffered frame. This is repeated until the AP has no more frames for the station.

The other method is by using Automatic Power Saving Delivery (APSD). To use APSD, a station submits a Traffic Specification (TSPEC) request with the field APSD field set to indicate APSD is to be used (e.g. setting the APSD field to a 1). A TSPEC contains an estimate of the data traffic and associated requirements. All buffered frames associated with an admitted APSD TSPEC are transmitted during a service period. There are two types of service periods possible under APSD, unscheduled and scheduled, thus leading to two variants of APSD, namely Unscheduled APSD and Scheduled APSD. Unscheduled APSD can be used only with contention-based access, while Scheduled APSD can be used with both contention-based and polled access. APSD can be combined efficiently with traditional (legacy) power management features to accommodate mixed traffic.

It should be noted that in the environment involving the present invention, the TIM has been given an expanded definition. The TIM includes traffic that is to be retrieved by legacy power save method and by Unscheduled APSD. The TIM and the More Data bit indicate whether traffic is buffered at the AP. Since the TIM and the More Data bit reflect all buffered traffic, stations with non-periodic traffic are able to use Unscheduled APSD to retrieve traffic. Accordingly, battery life is extended. The AP determines the end of the service period, as it deems appropriate.

An unscheduled service period, which begins when the AP receives a QoS Data/Null frame associated with the appropriate AC from the station. If admission control is mandatory for the traffic category of an admitted TSPEC, the service period ends after the AP has attempted to transmit all frames destined for the APSD station and associated with the admitted APSD TSPEC. Otherwise, the service period ends at the discretion of the AP, but not before the AP has attempted to transmit at least one frame destined for the APSD station.

Figure 2A:
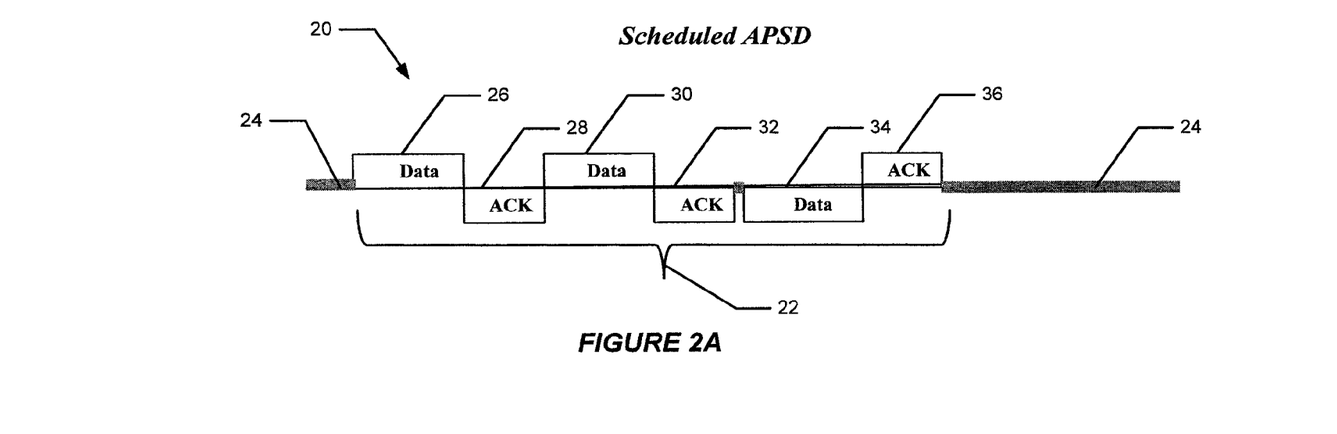
FIG. 2 comprises a diagram of the awake time for a station in scheduled Automatic Power Saving Mode (APSD) and in unscheduled APSD.

Referring now to FIG. 2A, a diagram of the data flow 20 during scheduled APSD is shown. The time the station is awake is during interval 22. At other times 24, contention may occur. As shown during scheduled APSD, data 26, 30 and 34 and the corresponding acknowledgements (ACKs) 28, 32 and 36 take place without collisions or other interruptions.

The Unscheduled APSD option is useful only if there exists, at minimum, one uplink or bi-directional traffic stream because nothing can be retrieved from the AP buffer if there is no uplink stream. An uplink stream could contain, or exclusively comprise, QoS Null frames, each generated whenever the station receives a TIM indication that there are buffered frames at the AP, in order to receive such frames. The TIM definition as been expanded to indicate the presence of frames associated with any AC at the AP for the station. Previously, the TIM was used only for the legacy power save method. Accordingly, the TIM indicated only the presence of frames at the AP that would be retrieved through the legacy method. There was no way to find out whether there were frames buffered at the AP that be delivered through unscheduled APSD. Sending QoS Null frames uplink without first receiving an indication that there are frames buffered at the AP is discouraged, as it would be inefficient from both a power consumption and channel use perspective to transmit QoS Null frames uplink in order to find out whether there are frames buffered at the AP. A scheduled service period, which is established with a downlink or bi-directional TSPEC with appropriate signaling, repeats regularly at the Service Interval, with the first service period starting at the Start of Service Time. The Service Interval and Start of Service Time, which are returned by the AP in the Schedule element, are determined so that the overlap between service periods of different stations is minimal. An example of a method for deriving such a schedule is described later.

The end of a service period in Scheduled APSD is determined as in the case of Unscheduled APSD. If admission control is mandatory for the traffic category of an admitted TSPEC, the service period ends after the AP has attempted to transmit all frames destined for the APSD station and associated with the admitted APSD TSPEC. Otherwise, the service period ends at the discretion of the AP, but not before the AP has attempted to transmit at least one frame destined for the APSD station.

When a station wants to use Scheduled APSD, it may indicate the time when it first expects to receive traffic associated with the submitted APSD TSPEC in order to reduce the time the station spends in the Awake state. The AP may adjust the Service Start Time in the Schedule element it returns in order to stagger service periods of different stations and thus shorten the time each power-saving station spends in the Awake state. Unless a schedule is already established for the station, the adjusted value of the Service Start Time will be either the same or later than the requested Service Start Time in the TSPEC element, but will not be delayed longer than the duration of a service period relative to the requested Service Start Time. If a schedule is already established for a station, the Service Start Time returned upon receipt to a new TSPEC element from the same station can be made equal to the time the next established service period is expected to start following the transmission of the new Schedule element, as the station is expected to be in the Awake state at that time. If no Service Start Time is requested in the TSPEC element (i.e. if the value of this field is set to 0), it will be treated as if it were the same as the time the TSPEC element was received.

If several Traffic Streams (TSs) have established scheduled APSD TSPECs, the service periods should be aggregated. It is recommended that if the TSPEC for one TS from a station requests scheduled APSD delivery, then all TSs from the same station request scheduled APSD delivery. The AP responds with an aggregate schedule for all admitted TSPECs from a station, where the Service Interval does not exceed the lowest Max Service Interval for the TSs established by the station. The Service Start Time will not be later than a service period away from the earliest Service Start Time for all the TSs established for an APSD station.

Scheduled APSD is the only APSD option available to power-saving stations using Hybrid Coordination Function (HCF) polled access. At the start of the service period, the AP initiates a polled Transmission Opportunity (TXOP) by sending the frames buffered for the power-saving station, preferably piggybacked onto QoS CF-Poll frames or QoS CF-Ack frames for greater efficiency. Since admission control applies to all traffic categories under polled access, a service period will not end until the AP has attempted to transmit all frames destined for the APSD station and associated with the admitted APSD TSPEC Scheduled APSD enables power-saving stations that use Enhanced Distributed Channel Access (EDCA) for contention-based channel access to have a service period occur according to a pre-specified schedule. The AP, aware of the schedule, delivers the buffered frames promptly at the start of the service period, thus reducing the time spent by the station in the Awake state while waiting to receive its buffered frames from the AP. Having a preset schedule for waking up allows a power-saving station to go into a deeper sleep and wake up according to a set timer.

The schedule, which is generated by the AP, staggers the service periods of different stations, thus helping APSD stations using contention-based access avoid collisions among themselves. The AP attempts to minimize the overlap of different service periods, which helps reduce the time spent by the station in the Awake state while waiting to access the channel or receive its buffered frames from the AP.

It is recommended that at the start of a service period, the AP transmit the frames buffered for the station and refrain from transmitting for a short time interval in order to enable the station to gain access to the channel quickly. This way the station does not have to wait in the Awake state for the AP to complete its various other transmissions, which would drain the station's power, as the AP has a heavier traffic load than stations.

The probability of immediate access to the channel following the downlink transmission(s) can be increased by allowing the EDCA stations using Scheduled APSD to used shorter backoff delays than other EDCA stations with the same priority traffic. For example, a top priority frame from an EDCA station using Scheduled APSD could be transmitted on the channel using always a backoff delay of 1. The probability of accessing the channel immediately following the downlink transmission of buffered frames is increased. Since only EDCA stations using Scheduled APSD are given this privilege, and their service periods are staggered, there is no chance of a collision among them. In the event there is a collision with another EDCA station, not using Scheduled APSD, the Scheduled APSD station may attempt retransmission with a backoff delay that is again less than that of the colliding station. In the example of the top priority frame, a backoff delay of 1 may be used on the retry of the Scheduled APSD station, while the other station will be attempting retransmission with a backoff delay drawn from a yet wider window.

The Scheduled APSD option is useful regardless of whether there is any uplink traffic generated by the station. It is not necessary for the APSD station to generate QoS-Null frames in order to receive buffered downlink traffic, as would be necessary in the case of Unscheduled APSD.

Figure 2B:
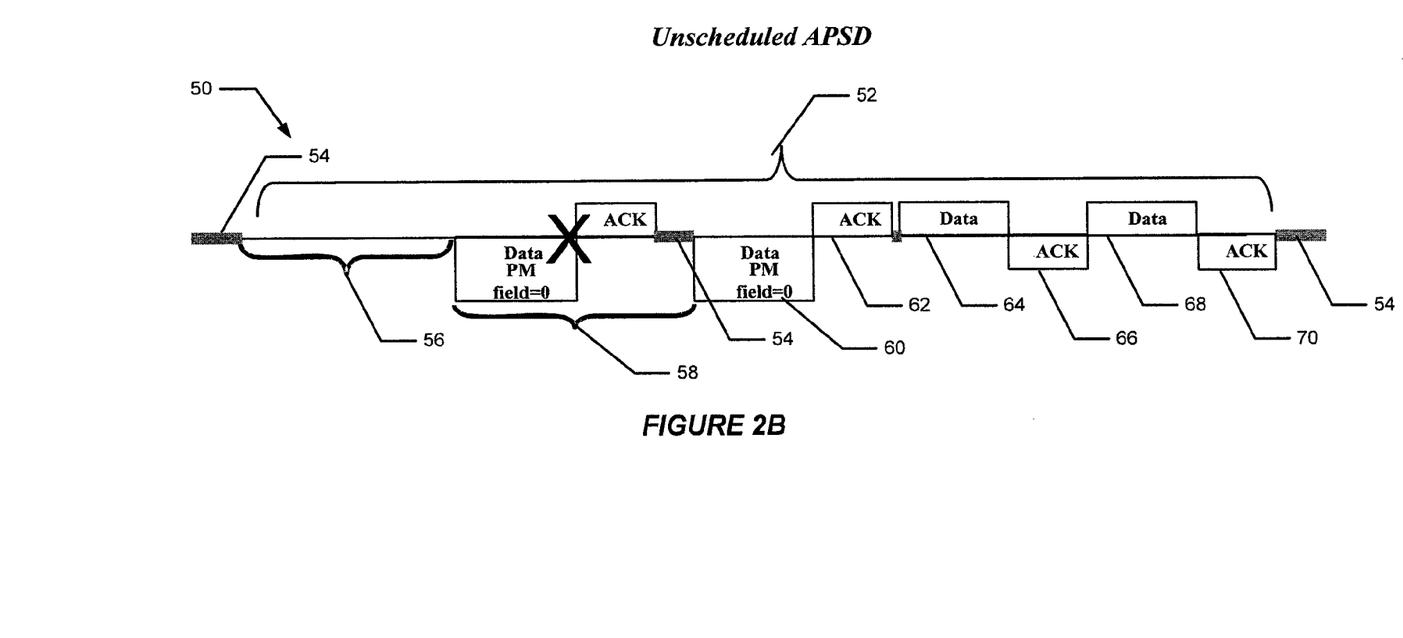

Referring now to FIG. 2B, a diagram of the data flow 50 during unscheduled APSD is shown. The time the station is awake is during interval 52. At other times 54, contention may occur. A collision 58 is shown which takes place after a waiting period 56. This waiting period is to allow the AP to finish transmitting. As shown during unscheduled APSD, data 60, 64 and 68 and the corresponding acknowledgements (ACKs) 62, 66 and 70 take place, however collisions are possible. The Unscheduled APSD option does not require a service period schedule to be generated by the AP, while scheduled APSD does. The Scheduled APSD option is efficient to use for more types of traffic than Unscheduled APSD. A station accessing the channel through EDCA would stay awake for a shorter time when using Scheduled APSD (shown in FIG. 2A) than using unscheduled APSD (shown in FIG. 2B).

The efficiency gains expected from silence suppression on voice calls are reduced when using Unscheduled APSD because it requires the regular generation of QoS-Null frames in order to receive buffered frames from a periodic downlink stream. Silence suppression eliminates the voice frames generated when a party is silent. Scheduled APSD does not require the generation of additional frames, and thus does better with silence-suppressed voice.

The Scheduled APSD option provides better power economy because the station does not contend for the channel with other power saving stations using Scheduled APSD or need to wait for them to transmit their traffic. Additionally, the station need not be awake while the AP transmits its traffic to all other stations before the APSD station can transmit its own traffic and going back to sleep. Further, scheduled service periods allow the station to go into deeper sleep than would be possible if the station had to transmit (and initiate a service period) whenever a frame was generated.

A station in PS mode may use both delivery mechanisms at the same time for different types of traffic. Integration is useful when the downlink traffic is mixed, as for example when the buffered frames consist of a high-priority periodic traffic stream for which a scheduled APSD TSPEC has been admitted and low-priority data bursts possibly without a time pattern or predictability. All buffered frames associated with an admitted scheduled APSD TSPEC are transmitted during a service period. If traffic remains buffered at the AP at the end of a service period, the AP sets the End of Service Period (EOSP) field to 1 and the More Data field to 1. The station with frames remaining buffered at the AP at the end of a service period may receive its frames from the AP buffer either through the use of PS Polls, or by transitioning to Active mode until it receives its remaining buffered frames, and then transitioning back to the PS mode.

For integration of the legacy power saving delivery mechanism with Unscheduled APSD to be efficient, it is important that there exist an uplink periodic traffic stream. Generating QoS Null frames and transmitting them uplink just to find out whether there are buffered frames at the AP is inefficient from both a power consumption and channel use perspective. It is more efficient to wake up at the beacon to listen to the TIM, which indicates the presence of frames of any AC buffered at the AP, and then retrieve the buffered data by any of the available methods. That is, by sending a QoS Data/Null frame, by transitioning to the Active state temporarily or by sending a PS Poll, depending on how much data is buffered. Integration of Scheduled APSD with the legacy power saving delivery mechanism is efficient when there is a periodic downlink traffic stream. It is not necessary for the station to awaken at the beacon to read the TIM bit in order to find out whether there is traffic buffered at the AP. If there is buffered traffic not associated with an APSD TSPEC, the AP will either transmit it during the scheduled service period or notify the station by setting the More Data bit to 1 and the EOSP to 1 in the last downlink frame. The lower priority traffic destined for a station with an admitted APSD TSPEC will not receive preferential treatment over higher priority traffic destined for other stations. The APSD station, having been notified that traffic destined for it is buffered at the AP, and that the traffic cannot be transmitted during the scheduled service period, may transition to the Active mode until it has received all its traffic, and then transition back to PS mode. Alternatively, the station may send PS polls to retrieve the traffic.

The two APSD options could also be combined, whereon Scheduled APSD is used for the periodic data stream and Unscheduled APSD is used for the non-periodic (bursty) data. The non-periodic data would be retrieved from the AP with the aid of an uplink stream of QoS Null frames, each generated whenever the station receives a TIM indication that there are buffered frames at the AP. In addition to the APSD TSPEC needed for the high-priority periodic stream, APSD signaling is established for the non-periodic data.

One way to derive a service period schedule for Scheduled APSD is based on the adoption of a Basic Service Interval, which is the least common denominator of the most common service interval values expected within a BSS. An example would be the 10 ms sampling period used in many codecs. TSPECs containing service intervals that are not multiples of the Basic Service Interval would be denied and would receive an ADDTS response with Schedule=0 in the TSPEC and Status Code=39, suggesting that a TSPEC request be submitted for Unscheduled APSD.

Figure 3:
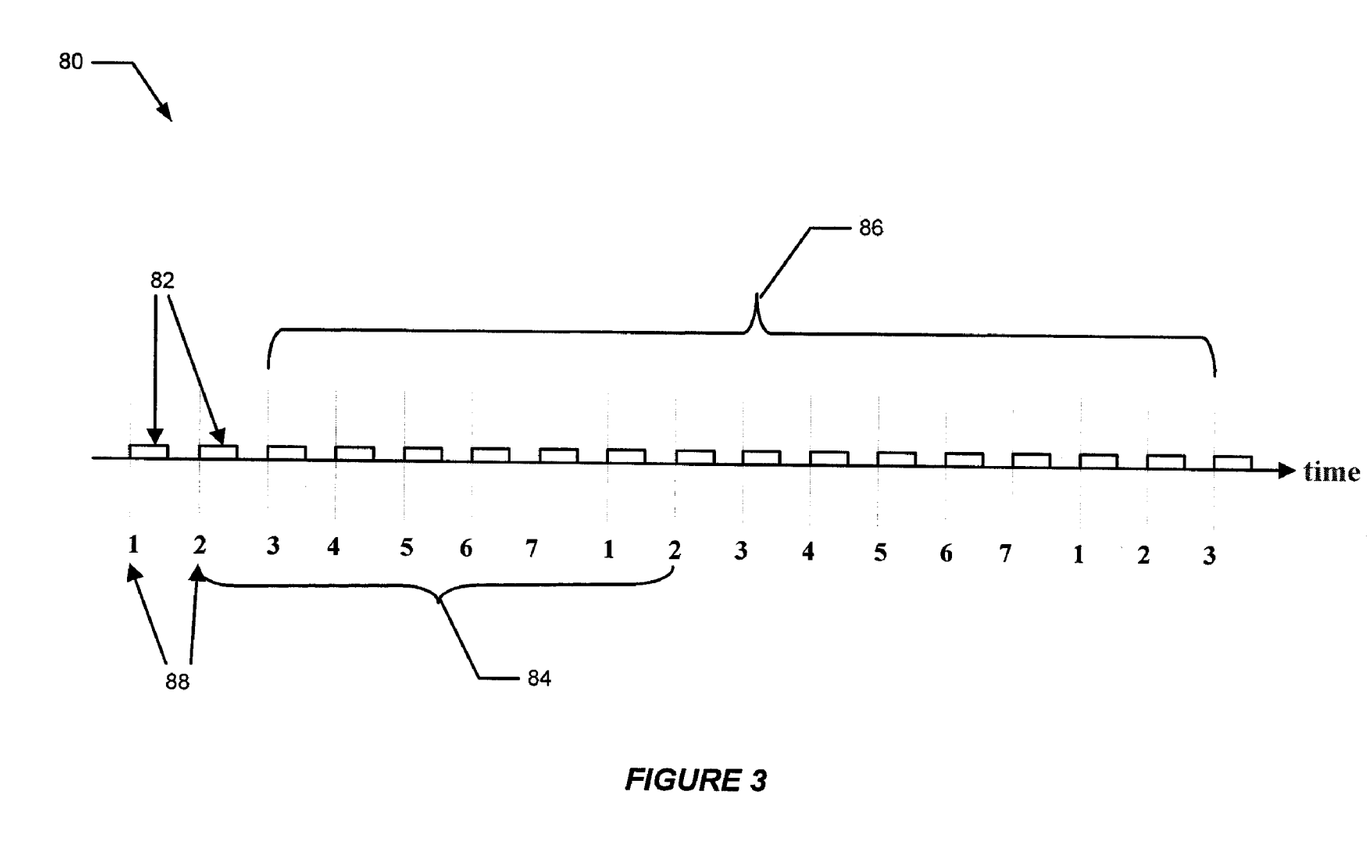
FIG. 3 comprises a diagram showing service intervals and service periods for a station in scheduled APSD.

Referring now to FIG. 3, in a particular example, with all service intervals being a multiple of the Basic Service Interval, the channel time can be slotted into APSD Channels repeating at fixed time intervals equal to the Basic Service Interval 84. In the shown time line 80 of channel slots, the numbers indicate one of seven APSD Channels and the Basic Service Interval 84 is 10 ms. The service period start times 88 are shown prior to the basic service interval 84 and the service interval 86. An APSD channel may be assigned to a single APSD station with service interval 86 equal to the Basic Service Interval 84, or can be shared by two or more power-saving stations with Traffic Streams (TSs) having longer service intervals. In the earlier example, one APSD channel can be shared either by two TSs with service intervals of 20 ms, three TSs with service interval of 30 ms, or by a single TS with a 20 ms service interval and two TSs with 40 ms service interval.

The APSD slots must be longer than the expected service periods 82, assuming a nominal transmission rate. When traffic is transmitted at a higher rate, or when the service period is shorter than the allotted time, more room will be left for other EDCA transmissions. While the above was described regarding producing a service schedule for APSD, it should be appreciated that this also applies to producing a polling schedule.

A flow chart of the presently disclosed method is depicted in FIGS. 3-7. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4:
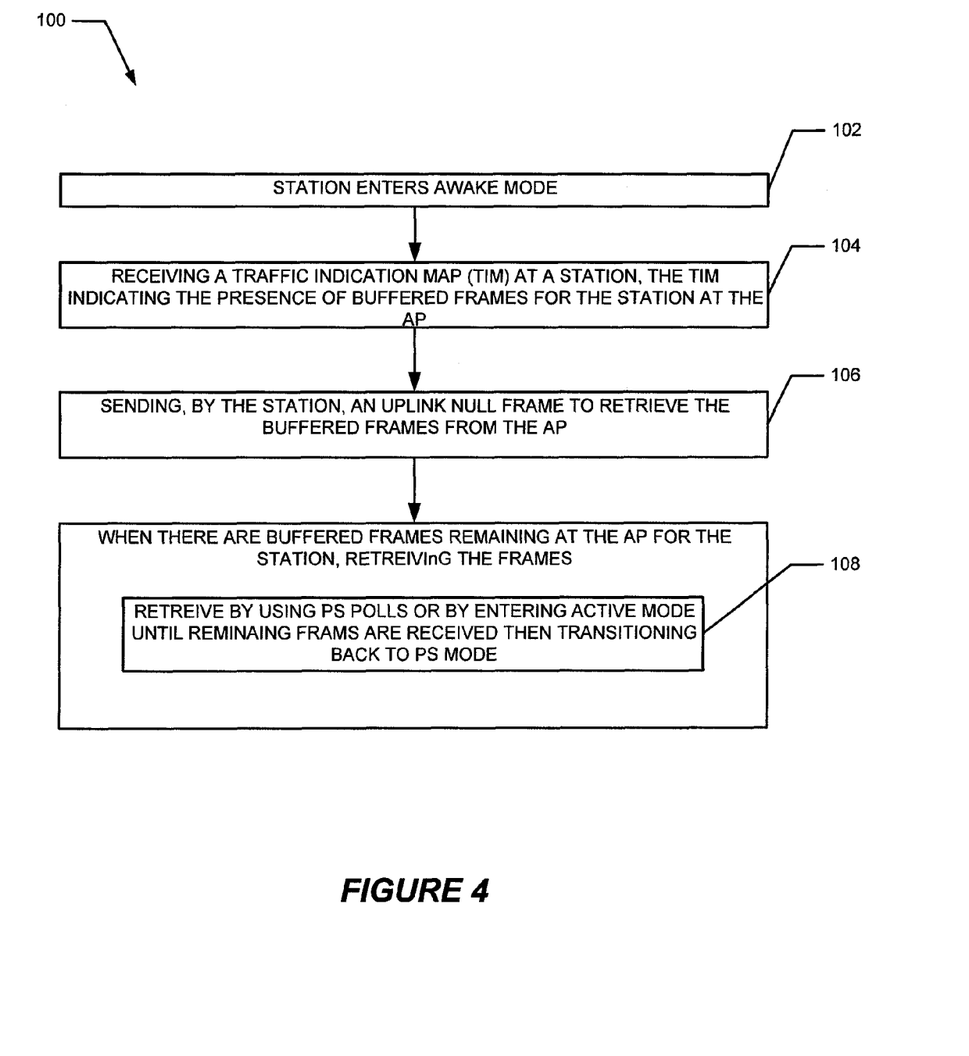
FIG. 4 comprises a flow diagram of a particular embodiment of performing unscheduled APSD in accordance with aspects of the present invention.

Referring now to FIG. 4, a particular embodiment of a method 100 of providing power management in a WLAN including an AP and at least one station is shown. The method 100 begins with processing block 102 wherein a station enters awake mode. this may be done according to a schedule.

In processing block 104, a Traffic Indication Map (TIM) is received at the station. The TIM indicates the presence of any buffered frames for the station at the AP.

In processing block 106, the station sends an uplink QoS Data frame or a Null frame to the AP. This allows the station to retrieve the buffered frames from the AP.

In processing block 108, when there are buffered frames remaining at the AP for the station, these additional frames are received. The additional frames are retrieved until a downlink frame is received containing an indication that it is the last frame to be transmitted during the service period. These additional frames may be received, as shown in processing block 110, by using conventional PS polls or by the station transitioning to Active mode, retrieving the frames, then transitioning back to PS mode.

Figure 5A:
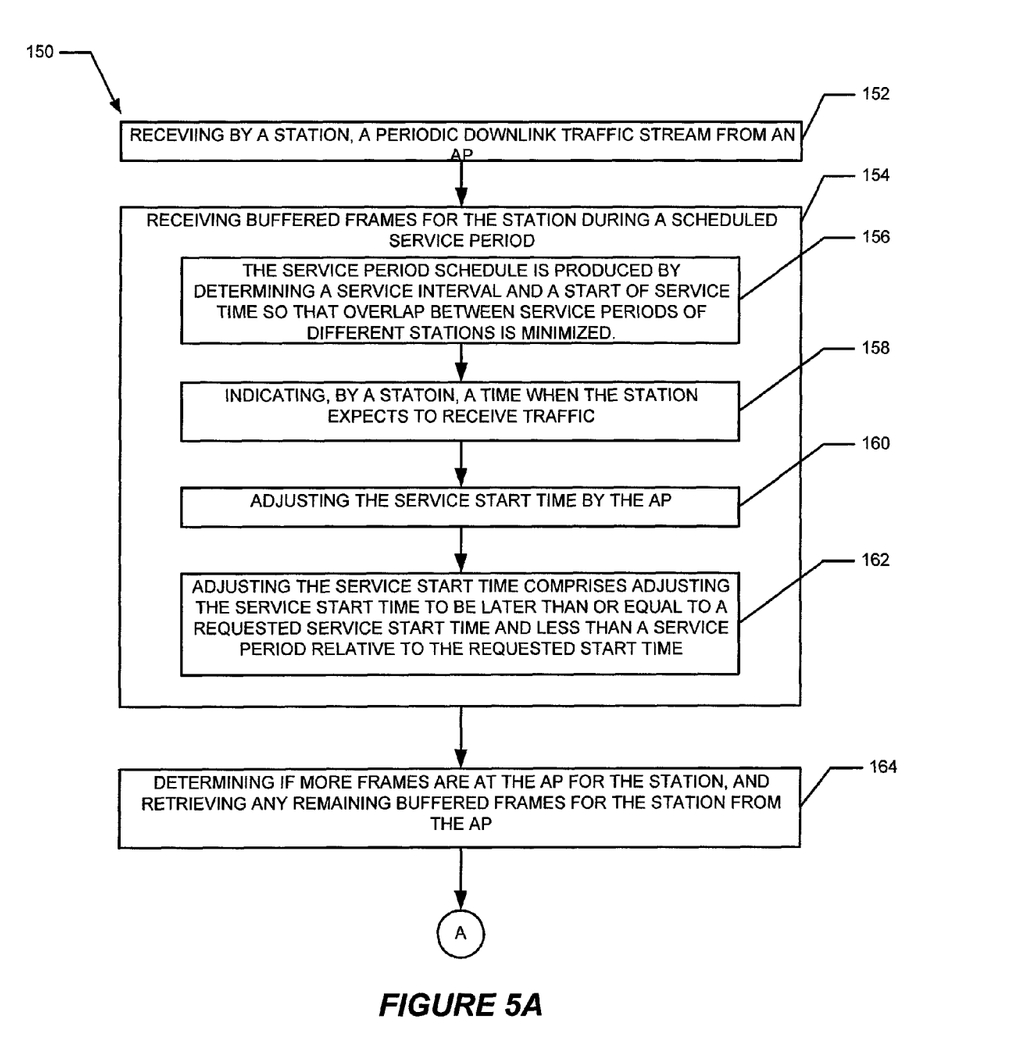
FIG. 5 comprises a flow diagram of another particular embodiment of performing unscheduled APSD in accordance with aspects of the present invention.
Figure 5B:
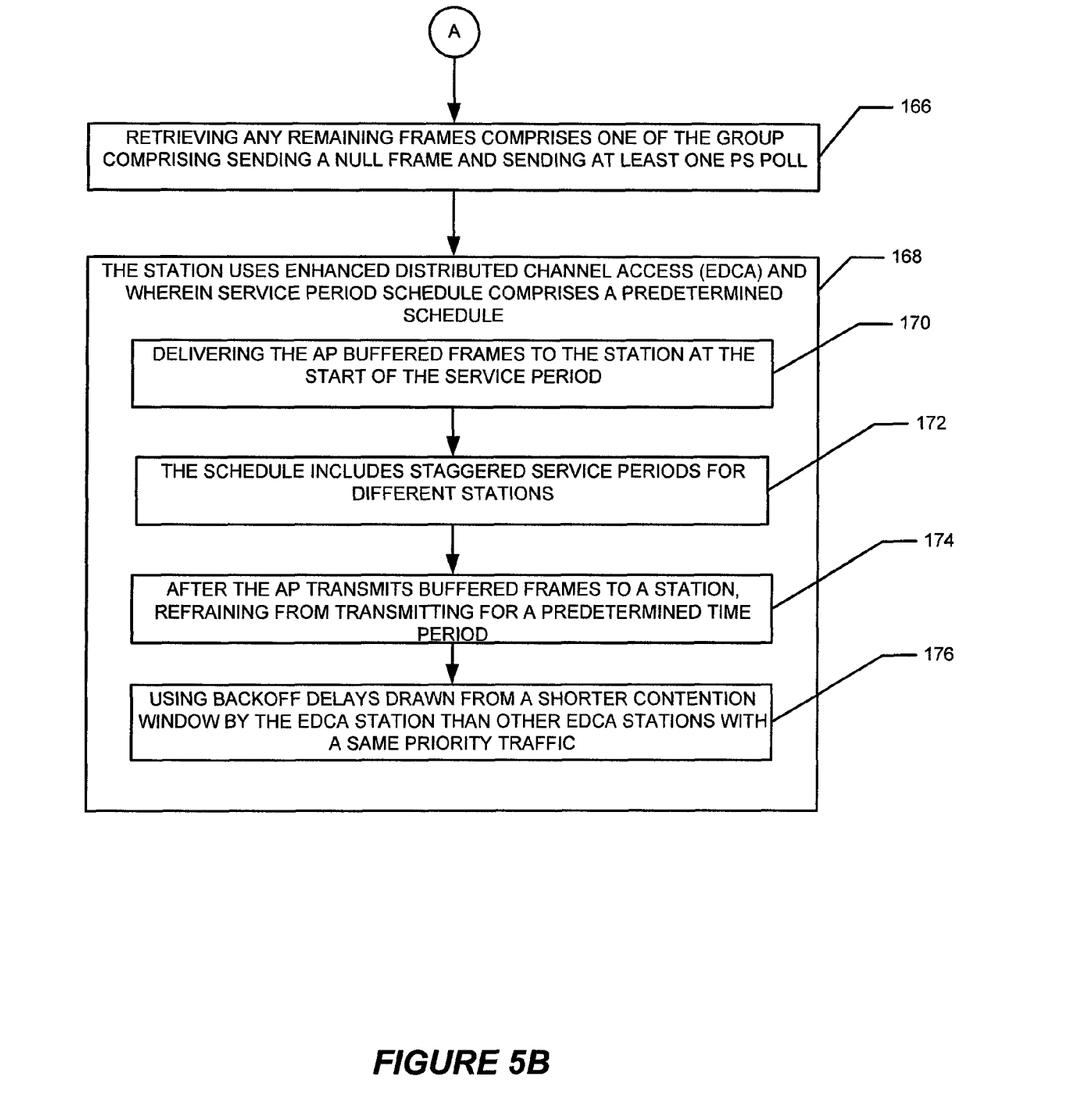

Referring now to FIGS. 5A-5B, a method of providing power management in a WLAN including an AP and at least one station is shown. The method 150 begins with processing block 152 wherein a periodic downlink traffic stream is received by a station from an AP.

In processing block 154, buffered frames are received for the station during a scheduled service period until a downlink frame is received containing an indication that it is the last frame to be transmitted during the service period In processing block 156, the service period schedule is produced by determining a service interval and a start of service time so that overlap between service periods of different stations is minimized. In processing block 158, a station can indicate a time when the station expects to receive traffic. Further, as shown in processing block 160, the service start time may be adjusted by the AP. In processing block 162, the service start time can be adjusted to be later than or equal to a requested service start time and less than a service period relative to the requested start time.

Referring now to processing block 164, a determination is made regarding whether there are additional buffered frames remaining at the AP, and when there are, these additional frames are retrieved.

In processing block 166, the remaining frames are retrieved by either sending a null frame, sending at least one PS Poll, or by the station transitioning to Active mode, retrieving the frames, then transitioning back to PS mode.

In processing block 168, the station uses Enhanced Distributed Channel Access (EDCA) and the service period schedule comprises a predetermined schedule. As shown in processing block 170, the buffered frames are delivered to the station at the start of the service period. Further, as recited in processing block 172, the schedule may includes staggered service periods for different stations.

In processing block 174, after the AP transmits buffered frames to a station, it refrains from transmitting for a predetermined time period. As shown in processing block 176, backoff delays may be used which are drawn from a shorter contention window by the EDCA station than other EDCA stations with a same priority traffic.

Figure 6:
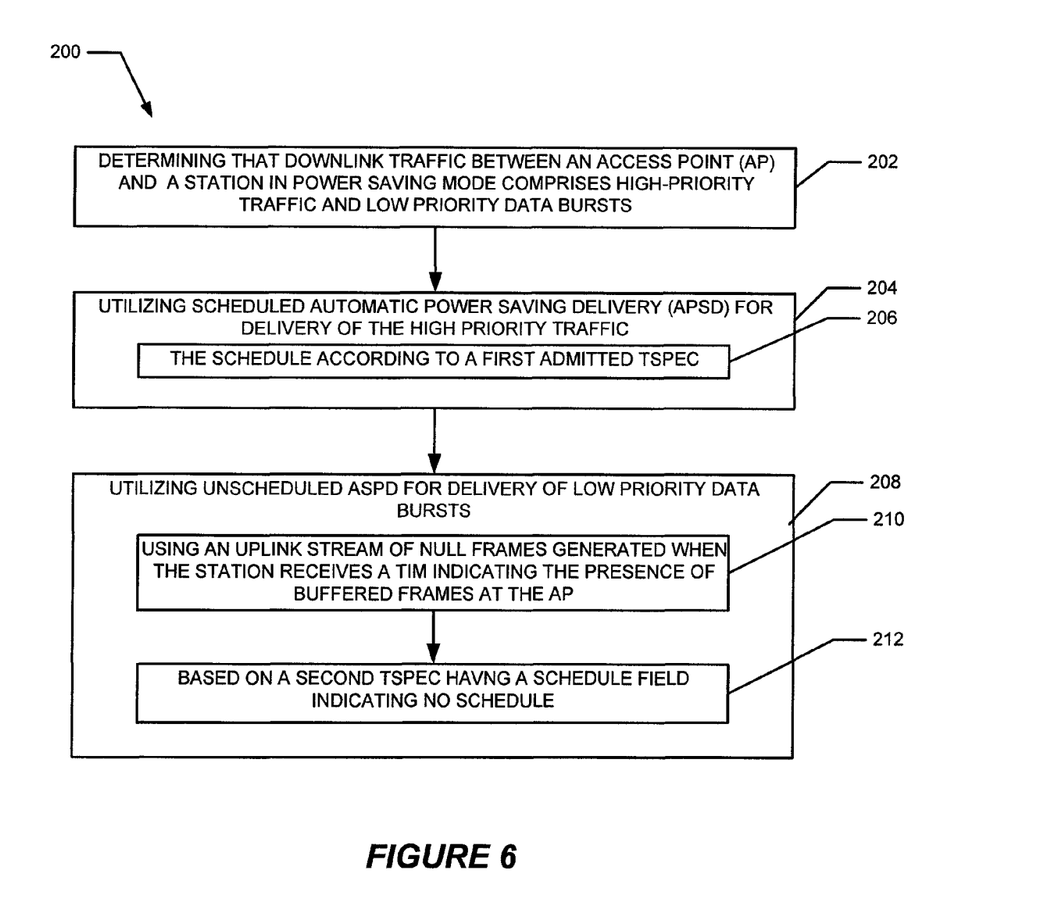
FIG. 6 comprises a flow diagram of a particular embodiment of performing unscheduled APSD and scheduled APSD in accordance with aspects of the present invention.

Referring now to FIG. 6, a method 200 of providing power management in WLANs is depicted. Method 200 begins with processing block 202 wherein a determination is made regarding downlink traffic between an Access Point (AP) and a station in power saving mode comprises periodic traffic and non-periodic traffic.

In processing block 204, scheduled Automatic Power Saving Delivery (APSD) is used for delivery of the periodic traffic. In processing block 206, the schedule for the scheduled APSD is provided in accordance with a first TSPEC.

Referring now to processing block 208, unscheduled APSD is used for delivery of non-periodic traffic. In processing block 210, this is accomplished by using an uplink of null frames which is generated when the station receives a TIM indicating the presence of buffered frames at the AP.

Figure 7:
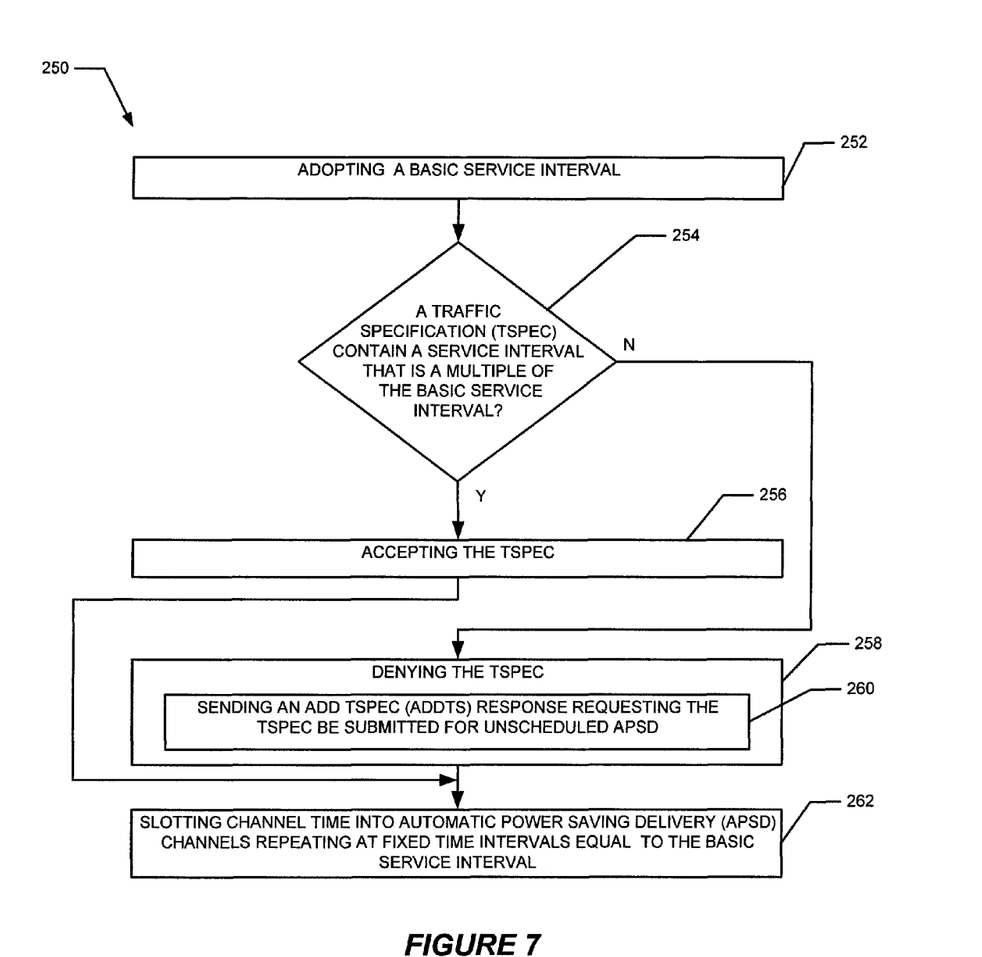
FIG. 7 comprises a flow diagram of a particular embodiment of a method for determining a schedule for performing scheduled APSD in accordance with aspects of the present invention.

Referring now to FIG. 7, a method 250 of deriving an APSD schedule in a WLAN is shown. While the method is described regarding an APSD schedule, the method is also applicable to deriving a polling schedule. The method begins with processing block 252, wherein a basic service interval is adopted. One way to derive a service period schedule for Scheduled APSD is based on the adoption of a Basic Service Interval, which is the least common denominator of the most common service interval values expected within a BSS.

In decision block 254 a determination is made regarding whether a TSPEC contains a service interval that is a multiple of the basic service interval. When the service interval is a multiple of the basic service interval, processing continues with processing block 256, otherwise processing continues at processing block 258.

In processing block 256, when a TSPEC contains a service interval that is a multiple of the basic service interval then the TSPEC is accepted.

In processing block 258, when a TSPEC contains a service interval that is not a multiple of the basic service interval then the TSPEC is denied. As shown in processing block 260, denying the TSPEC may further comprise sending an Add TSPEC (ADDTS) response with a schedule field set to 0 and with a status code of 39, indicating that that the TSPEC request be submitted for Unscheduled APSD.

As shown in processing block 262, channel time is slotted into APSD channels repeating at fixed time intervals equal to the basic service interval.

In processing block 264, a time schedule channel is assigned to a TSPEC based on the service interval contained in the TSPEC and the service intervals of other TSPECs already assigned to the channel.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A method of providing power management in a Wireless Local Area Network (WLAN) comprising:
   receiving a Traffic Indication Map (TIM) at a station, said TIM indicating the presence of buffered frames, associated with any access category (AC), for said station at an Access Point (AP), wherein said TIM indicates the presence of scheduled frames and wherein said TIM also indicates the presence of unscheduled frames such that stations with non-periodic traffic are able to use Automatic Power Save Delivery (APSD) to retrieve said unscheduled frames;
   sending, by said station, one of an uplink quality-of-service (QoS) Data frame when one is buffered, and a Null frame to retrieve said buffered frames from said AP; and
   said station remaining awake to receive frames from the AP, as indicated by the TIM, until a downlink frame is received containing an indication that it is the last frame to be transmitted in the service period.

2. A method of providing power management in a Wireless Local Area Network (WLAN) comprising:
   receiving a Traffic Indication Map (TIM) at a station, said TIM indicating the presence of buffered frames for said station at an Access Point (AP), wherein said TIM indicates the presence of scheduled frames and wherein said TIM also indicates the presence of unscheduled frames such that stations with non-periodic traffic are able to use Automatic Power Save Delivery (APSD) to retrieve said unscheduled frames;
   sending, by a station, one of an uplink data frame when one is buffered, and a null frame to retrieve said buffered frames from said AP;
   said station remaining awake to receive frames from the AP, as indicated by the TIM, until a downlink frame is received containing an indication that it is the last frame to be transmitted in the service period; and
   determining at the end of service period whether there are more buffered frames remaining for said station at the AP, wherein said buffered frames include scheduled frames and wherein said buffered frames further include unscheduled frames such that stations with non-periodic traffic are able to use Automatic Power Save Delivery (APSD) to retrieve said unscheduled frames.

3. The method of claim 2 further comprising said station retrieving remaining buffered frames by one of sending a null frame, sending Power Save (PS) Polls, and entering the Active mode and then transitioning back to PS mode.

4. A method of providing power management in a Wireless Local Area Network (WLAN) comprising:
   receiving a Traffic Indication Map (TIM) at a station, said TIM indicating the presence of buffered frames for said station at an Access Point (AP), wherein said TIM indicates the presence of scheduled frames and wherein said TIM also indicates the presence of unscheduled frames such that stations with non-periodic traffic are able to use Automatic Power Save Delivery (APSD) to retrieve said unscheduled frames;
   receiving, by said station, a periodic downlink traffic stream from an Access Point (AP) during a scheduled period;
   said station remaining awake to receive frames from the AP, as indicated by the TIM, until a downlink frame is received containing an indication that it is the last frame to be transmitted in the service period; and
   determining, when said station receives the indication of the end of the service period in the downlink frame, whether there are more buffered frames remaining for said station at the AP, wherein said buffered frames include scheduled frames and wherein said buffered frames further include unscheduled frames such that stations with non-periodic traffic are able to use APSD to retrieve said unscheduled frames.

5. The method of claim 4 wherein said station retrieving any remaining buffered frames by one of sending a null frame, sending Power Save (PS) Polls, and by entering the Active mode and then transitioning back to PS mode.

6. The method of claim 4 further comprising indicating, by a station, a time when said station expects to receive traffic.

7. The method of claim 4 wherein a service period schedule is produced by the AP by determining a service interval and a start time so that overlap between service periods of different stations is minimized.

8. The method of claim 7 further comprising adjusting the service start time to be later than or equal to a requested service start time and less than a service period relative to said requested start time.

9. The method of claim 4 wherein said station uses Enhanced Distributed Channel Access (EDCA) and wherein a service period schedule comprises a predetermined schedule.

10. The method of claim 9 further comprising delivering by said AP buffered frames to said station at the start of said service period.

11. The method of claim 9 wherein said schedule includes staggered service periods for different stations.

12. The method of claim 9 wherein, after said AP transmits buffered frames to a station, refraining from transmitting for a predetermined time period.

13. The method of claim 9 further comprising using back-off delays drawn from a shorter contention window by said EDCA station than other EDCA stations with a same priority traffic.

\* \* \* \* \*